US010117076B2

(12) United States Patent
Sharma

(10) Patent No.: US 10,117,076 B2
(45) Date of Patent: Oct. 30, 2018

(54) DESTINATION SELECTION FOR AN OFFLINE CHARGING SYSTEM TO AVOID REVERSION

(71) Applicant: Alcatel-Lucent USA Inc., Murray Hill, NJ (US)

(72) Inventor: Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 177 days.

(21) Appl. No.: 15/159,494

(22) Filed: May 19, 2016

(65) Prior Publication Data
US 2017/0339544 A1 Nov. 23, 2017

(51) Int. Cl.
| | |
|---|---|
| *H04L 12/28* | (2006.01) |
| *H04L 12/56* | (2006.01) |
| *H04W 4/24* | (2018.01) |
| *H04L 29/08* | (2006.01) |
| *H04L 12/14* | (2006.01) |
| *H04L 12/863* | (2013.01) |
| *H04L 12/865* | (2013.01) |

(52) U.S. Cl.
CPC .............. *H04W 4/24* (2013.01); *H04L 12/14* (2013.01); *H04L 47/6255* (2013.01); *H04L 47/6275* (2013.01); *H04L 47/6295* (2013.01); *H04L 67/14* (2013.01)

(58) Field of Classification Search
CPC .................................. H04W 4/26; H04L 67/14
USPC ................................................... 370/412, 235
See application file for complete search history.

(56) References Cited

U.S. PATENT DOCUMENTS

| | | | |
|---|---|---|---|
| 8,468,267 B2* | 6/2013 | Yigang | H04L 45/306 709/219 |
| 9,161,199 B1 | 10/2015 | Sharma | |

(Continued)

FOREIGN PATENT DOCUMENTS

WO 2016048928 A1 3/2016

OTHER PUBLICATIONS

F. Baker; Cisco Systems; Network Working Group; IETF Recommendations Regardig Active Queue Management draft-ietf-aqm-recommendation-06; Jul. 1, 2014.

(Continued)

*Primary Examiner* — Chuong T Ho
(74) *Attorney, Agent, or Firm* — Duft & Bornsen, PC

(57) ABSTRACT

Systems, methods, and software that distribute accounting requests to a plurality of Charging Data Functions (CDFs). One embodiment comprises a distributor unit that connects to the CDFs, which register their queues with the distributor unit. When receiving an accounting request (e.g., interim or stop) for a session, the distributor unit extracts an identifier from the accounting request indicating a destination queue previously selected for the session. When the destination queue is not accepting new sessions or ongoing sessions, the distributor unit identifies a prioritized list for the session, identifies a position of the destination queue in the prioritized list, searches the prioritized list for an alternate queue having a lower priority than the destination queue, and having a status indicating that the alternate queue is accepting new sessions. The distributor unit then selects the alternate queue as an alternate destination queue for the session.

20 Claims, 6 Drawing Sheets

(56) References Cited

U.S. PATENT DOCUMENTS

| | | | | |
|---|---|---|---|---|
| 2009/0063315 A1* | 3/2009 | Cai | .................... | G06Q 30/0284 |
| | | | | 705/32 |
| 2011/0040845 A1* | 2/2011 | Cai | ........................ | H04L 47/10 |
| | | | | 709/206 |
| 2011/0207431 A1* | 8/2011 | Sharma | .................... | H04L 12/14 |
| | | | | 455/406 |
| 2012/0123914 A1* | 5/2012 | Sharma | ................ | H04M 15/00 |
| | | | | 705/30 |
| 2012/0221445 A1* | 8/2012 | Sharma | .............. | H04L 12/1403 |
| | | | | 705/30 |
| 2013/0091041 A1* | 4/2013 | Sharma | .............. | H04L 67/1034 |
| | | | | 705/30 |
| 2016/0094722 A1 | 3/2016 | Sharma | | |
| 2016/0165068 A1* | 6/2016 | Sharma | ................ | H04M 15/65 |
| | | | | 455/406 |
| 2017/0118108 A1* | 4/2017 | Avci | ........................ | H04L 45/36 |

OTHER PUBLICATIONS

Hoeiland-Joergensen; Karlstad University AZM Working Group; FlowQueue-Codel; Oct. 19, 2015.

\* cited by examiner

DESTINATION SELECTION FOR AN OFFLINE CHARGING SYSTEM TO AVOID REVERSION

TECHNICAL FIELD

The present disclosure is related to the field of communication systems and, in particular, to offline charging.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external Packet Data Networks (PDN), such as the Internet. Some examples of packet core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations.

The service providers use offline and online charging functions to keep track of the resource usage incurred by each device accessing the various services. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

According to 3GPP TS 32.240, offline charging is a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS). The charging events may be provided by the CTF in an accounting request, such as a Diameter Accounting Request (ACR).

The CDF receives the charging events from one or more CTFs, and uses the information included in the charging events to construct CDRs. A CDR is a formatted collection of information about a chargeable event (e.g., time of call or session set-up, time of call or session tear-down, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), optionally correlates the CDRs and writes the CDRs into a CDR file, and makes the CDR file available to the billing domain.

A typical operator network will utilize multiple CDFs and CGFs to implement offline charging. Thus, a front-end device, such as a Diameter Routing Agent (DRA), is used in conjunction with the OFCS to distribute charging events from the CTFs to the CDFs. When a CDF goes out-of-service, the front-end device needs to identify an alternate destination for the charging events. It is desirable for the front-end device to effectively determine the alternate destination, and avoid overloading another CDF of the OFCS.

SUMMARY

Embodiments described herein provide for handling of charging events for a session when a CDF goes out-of-service (OOS) and is unavailable to handle future charging events. Each CDF registers one or more queues with a front-end device for receiving accounting requests. The front-end device is enhanced in the embodiments described herein to distribute accounting requests to the respective queues of the CDFs. More particularly, the front-end device is configured to handle scenarios where a queue is taken out of service by a CDF, and an alternate queue is selected for a session. Before selecting an alternate queue, the front-end device determines the status of queue so that accounting requests are not sent to a CDF that is potentially overloaded.

One embodiment comprises a distributor unit configured to connect to a plurality of Charging Data Functions (CDFs) of an Offline Charging System (OFCS). The distributor unit (through an interface) is configured to receive information from the CDFs for registering queues associated with the CDFs. The distributor unit is configured to receive an initial accounting request from a Charging Trigger Function (CTF) for a session, generate (through a processor) a prioritized list of the queues for the session based on a distribution algorithm, select a destination queue from the prioritized list for the session, and transmit the initial accounting request to the destination queue. The distributor unit is configured to receive a subsequent accounting request from the CTF for the session, extract a first identifier from a parameter of the subsequent accounting request indicating the destination queue previously selected for the session, and determine a status of the destination queue. When the status of the destination queue indicates that the destination queue is not accepting new sessions or ongoing sessions, the distributor unit is configured to identify the prioritized list for the session, identify a position of the destination queue in the prioritized list, and search the prioritized list for a first alternate queue having a lower priority than the destination queue, and having a status indicating that the first alternate queue is accepting new sessions. The distributor unit is configured to select the first alternate queue as an alternate destination queue for the session, and transmit the subsequent accounting request to the alternate destination queue.

In another embodiment, the subsequent accounting request comprises a Diameter Accounting Request (ACR), and the distributor unit is configured to extract the first identifier from a Destination-Host Attribute Value Pair (AVP) of the ACR indicating the destination queue.

In another embodiment, the distributor unit is configured to receive an accounting answer for the subsequent accounting request from a CDF associated with the alternate destination queue, to add a second identifier for the alternate destination queue in a parameter of the accounting answer, and to transmit the accounting answer toward the CTF.

In another embodiment, the accounting answer comprises a Diameter Accounting Answer (ACA), and the distributor unit is configured to add the second identifier for the alternate destination queue to an Origin-Host Attribute Value Pair (AVP) of the ACA.

In another embodiment, when the processor fails to find the first alternate queue in the prioritized list having a lower priority than the destination queue, and having a status indicating that the first alternate queue is accepting new sessions, the distributor unit is configured to search from a top of the prioritized list for a second alternate queue having a status indicating that the second alternate queue is accepting new sessions.

In another embodiment, when the processor fails to find the second alternate queue in the prioritized list having a status indicating that the second alternate queue is accepting new sessions, the distributor unit is configured to determine that the OFCS is in an overload state.

In another embodiment, the distribution algorithm comprises a consistent hashing algorithm that generates the prioritized list of the queues based on a session identifier for the session, and names for the queues.

In another embodiment, the distributor unit is configured to monitor the status of each of the queues. The status of each of the queues indicates one of the following: accepting new sessions and ongoing sessions, accepting ongoing sessions only, or not accepting new sessions or ongoing sessions.

In another embodiment, in response to the initial accounting request, the distributor unit is configured to search the prioritized list for a candidate queue having a status indicating that the candidate queue is accepting new sessions, and to select the candidate queue as the destination queue for the session.

Another embodiment comprises a method of distributing accounting requests for a session from a distributor unit to a plurality of CDFs of an OFCS. The method includes receiving information in the distributor unit from the CDFs for registering queues associated with the CDFs. The method further includes receiving an initial accounting request in the distributor unit from a Charging Trigger Function (CTF) for a session, generating a prioritized list of the queues for the session based on a distribution algorithm, selecting a destination queue from the prioritized list for the session, and transmitting the initial accounting request from the distributor unit to the destination queue. The method further includes receiving a subsequent accounting request in the distributor unit from the CTF for the session, extracting a first identifier from a parameter of the subsequent accounting request indicating the destination queue previously selected for the session and determining a status of the destination queue. When the status of the destination queue indicates that the destination queue is not accepting new sessions or ongoing sessions, the method includes identifying the prioritized list for the session, identifying a position of the destination queue in the prioritized list, and searching the prioritized list for a first alternate queue having a lower priority than the destination queue, and having a status indicating that the first alternate queue is accepting new sessions. The method further includes selecting the first alternate queue as an alternate destination queue for the session, and transmitting the subsequent accounting request from the distributor unit to the alternate destination queue.

Another embodiment comprises a non-transitory computer readable medium embodying programmed instructions executed by a processor of a distributor unit that connects to a plurality of CDFs of an OFCS. The instructions direct the processor to receive information from the CDFs for registering queues associated with the CDFs. The instructions direct the processor to receive an initial accounting request from a Charging Trigger Function (CTF) for a session through an interface, generate a prioritized list of the queues for the session based on a distribution algorithm, select a destination queue from the prioritized list for the session, and transmit the initial accounting request to the destination queue through the interface. The instructions direct the processor to receive a subsequent accounting request from the CTF for the session through the interface, extract a first identifier from a parameter of the subsequent accounting request indicating the destination queue previously selected for the session, and determine a status of the destination queue. When the status of the destination queue indicates that the destination queue is not accepting new sessions or ongoing sessions, the instructions direct the processor to identify the prioritized list for the session, identify a position of the destination queue in the prioritized list, and search the prioritized list for a first alternate queue having a lower priority than the destination queue, and having a status indicating that the first alternate queue is accepting new sessions. The instructions direct the processor to select the first alternate queue as an alternate destination queue for the session, and transmit the subsequent accounting request to the alternate destination queue through the interface.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the disclosure are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
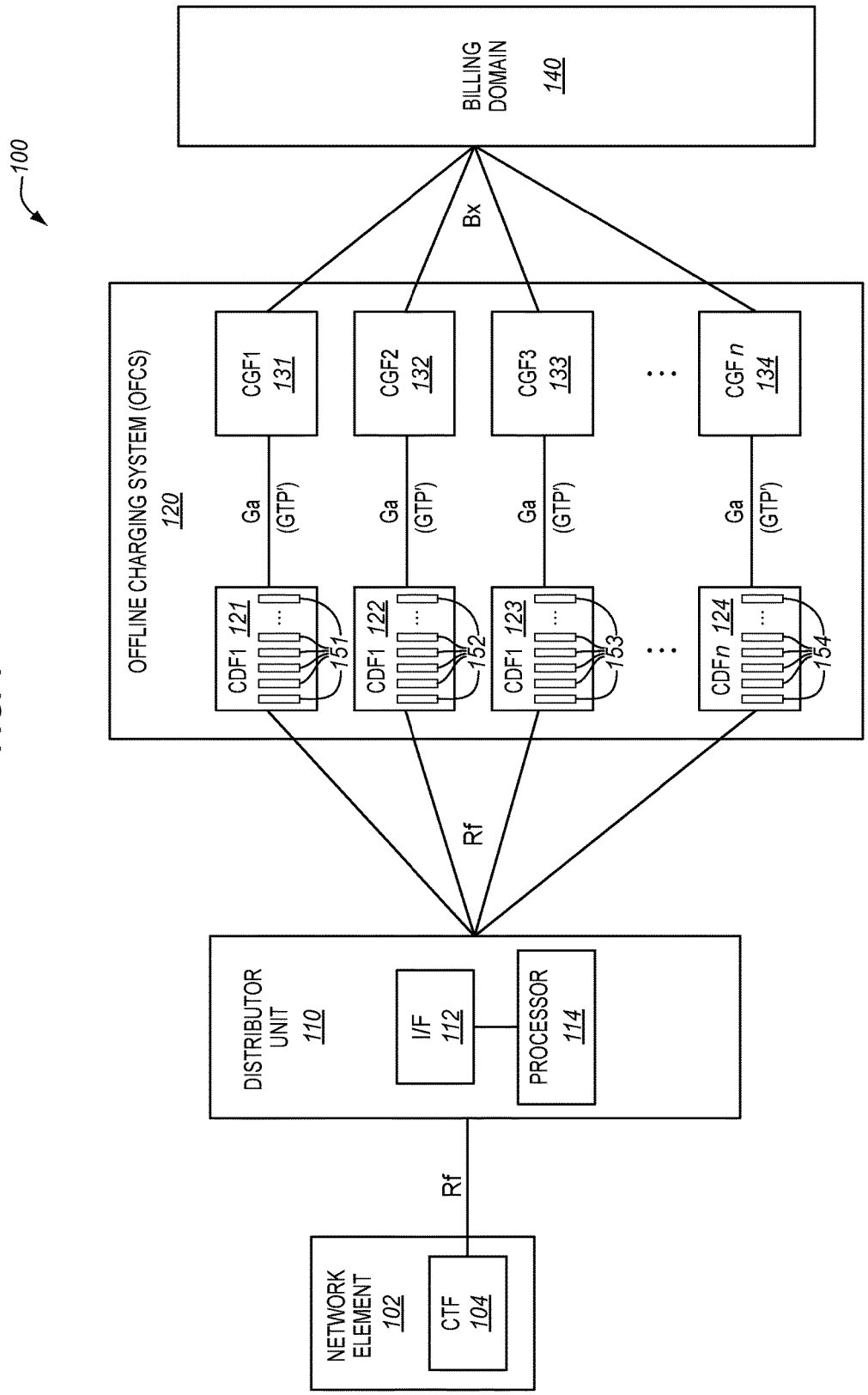
FIG. 1 illustrates an offline charging architecture in an exemplary embodiment.

FIG. 1 illustrates an offline charging architecture 100 in an exemplary embodiment. Architecture 100 may be implemented in a circuit-switched network or a packet-switched network that provides services to its subscribers (i.e., an end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 includes a network element 102 that connects to an offline charging system (OFCS) 120 through a distributor unit 110. A network element 102 is an apparatus or equipment used in the provision of services provided by a network. For example, a network element may comprise a Serving-Call Session Control Function (S-CSCF) or application server (AS) of an IMS network, a Serving Gateway (SGW) or a Packet Data Network Gateway (PGW) of an LTE network, etc. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 may use a Diameter Rf interface. CTF 104 assembles the charging information into accounting requests, such as a Diameter Rf Accounting Request (ACR). Although one CTF 104 is illustrated in FIG. 1, there may be many CTFs in contact with distributor unit 110. Although not specifically illustrated in FIG. 1, network element 102 may include a processor or other hardware component to implement CTF 104.

Diameter protocol is shown as the charging protocol in FIG. 1. However, other charging protocols may be used. Therefore, reference to an accounting request or accounting answer as discussed herein may refer to Diameter protocol or another charging protocol.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an accounting request of type "event" (e.g., ACR EVENT). Session-based charging is the process of reporting usage reports for a session, and uses the START, INTERIM, and STOP accounting data. During a session, CTF 104 may transmit 0, 1, or multiple interim accounting requests depending on the proceeding of the session.

In this embodiment, OFCS 120 includes a plurality of CDFs (CDF1-CDFn) 121-124. A CDF comprises an element or module within OFCS 120 that receives charging events from CTFs within network elements, formats the charging events into CDRs, and sends the CDRs to a CGF. Each CDF instance may be provided by an application blade of a blade server. A blade server is a server chassis that houses multiple electronic circuit boards known as server blades. Each blade is considered a server, and is typically dedicated to a single application. Each CDF instance may alternatively be provided by a virtual machine (VM). A virtual machine is a software computer that runs an operating system and one or more applications, which imitates hardware. Specialized software called a "hypervisor" emulates a Central Processing Unit (CPU), memory, hard disk, network, and other hardware resources. Many virtual machines are able to share the physical resources of a host, and a pool of distributed hardware resources from different hardware platforms may be used to implement multiple virtual machines.

OFCS 120 also includes a plurality of CGFs (CGF1-CGFn) 131-134. A CGF comprises an element or module within OFCS 120 that correlates CDRs for a session, and forwards a CDR file with the correlated CDRs to a billing domain 140. Billing domain 140 is the part of the operator network that receives and processes CDR files for billing mediation and other billing applications (e.g., statistical applications). The CDFs in OFCS 120 may communicate with the CGFs over a Diameter Ga interface. In the case shown in FIG. 1, GTP' may be used on the Ga interface to transport CDRs from the CDFs to the CGFs. While a 1:1 relationship is shown between the CDFs and CGFs in FIG. 1, an N:1 relationship is also possible. Although not specifically illustrated in FIG. 1, OFCS 120 may include one or more processors or other hardware components that implement CDFs 121-124 and CGFs 131-134.

Distributor unit 110 is implemented between CTFs (e.g., CTF 104) and the CDFs 121-124 in OFCS 120. The purpose of distributor unit 110 is to distribute accounting requests (e.g., Diameter ACRs) from CTFs among the multiple CDFs 121-124 within OFCS 120. An accounting request comprises a message for offline charging that reports a charging event, one example of which is a Diameter ACR.

In this embodiment, distributor unit 110 includes an interface (I/F) 112 and a processor (PROC'R) 114. Interface 112 comprises a component (e.g., hardware, software, or a combination of hardware and software) for communicating via Diameter Rf protocol or another type of charging protocol. Processor 114 comprises a component (i.e., hardware) that performs logic to distribute accounting requests to CDFs 121-124. Although distributor unit 110 is illustrated as being outside of OFCS 120, distributor unit 110 may be implemented on the same platform as OFCS 120.

The task of distributing accounting requests may include considering the weights, current load index, and other parameters of CDFs 121-124 to select a CDF instance for handling accounting requests for a session. Distributor unit 110 may follow a round-robin strategy in selecting a CDF for a particular session. Distributor unit 110 may work as a Back to Back User Agent (B2BUA), where charging sessions (e.g., Diameter sessions) with a CTF are terminated on distributor unit 110, and equivalent and corresponding charging sessions are started between distributor unit 110 and the selected CDF. Each CTF would establish a connection with distributor unit 110, and send an accounting request to distributor unit 110 that includes a session identifier (ID). The session ID is unique for the CTF for each session it reports.

CDFs 121-124 include processing queues 151-154, respectively, that are used to temporarily store accounting requests received from distributor unit 110 for processing by its associated CDF. A queue 151-154 is a physical or virtual element that stores a list of data items (e.g., accounting requests) to be retrieved by a processing element. The data items may be retrievable in a particular order, such as in the order received or as determined by the processing element. Each CDF 121-124 exposes processing queues 151-154 by registering them centrally with distributor unit 110. The number of the queues may vary for each CDF 121-124 (e.g., from 0 . . . 16), depending on the processing power of CDF 121-124 and load conditions. Each CDF 121-124 may regulate its incoming load by turning off one or more of its queues. The queues 151-154 associated with CDFs 121-124 are assigned a name or some other identifier to distinguish them from one another.

Distributor unit 110 is configured to select queues 151-154 as a destination for handling accounting requests based on a distribution algorithm. A distribution algorithm comprises any set of rules for calculating an ordered list of queues for a session. In one embodiment, distributor unit 110 may use a "consistent hashing" algorithm to generate the ordered list for a session. The consistent hashing algorithm may use the session ID (e.g., Diameter Session ID (DSID) in the accounting requests, and queue identifiers (e.g., queue names) to generate the ordered list. As stated above, each CDF 121-124 uses a certain number of queues commensurate with its processing capacity. If there are N queues spread across all instances of CDFs 121-124 in a deployment, then the consistent hashing algorithm would generate N values for a given session ID. The highest value is chosen as the destination for the session. So, the consistent hashing algorithm statically determines a hashed value for each queue instance from the queue name:

$Hs=F(QueueName)$

In an example, for 26 CDF instances with 6 registered queues each, 156 hashed values would be computed. Then, for each session in progress, distributor unit 110 may dynamically determine a hashed value for each session ID (e.g., DSID):

$Hi=F(SessionID)$

This value is used in computing the hash for each set of (SessionID, QueueName):

$Hc=F(Hs, Hi)$

Therefore, "Hc" represents a prioritized list of queues pertaining to a particular session. Again, if there are 26 CDF instances with 6 registered queues each, then the prioritized list would include 156 hashed values ordered according to priority. Distributor unit 110 may select the maximum Hc (Hc_max) as the destination queue for accounting requests of a session. Distributor unit 110 may then route accounting requests for the session to the destination queue to be processed by its associated CDF (referred to herein as the destination CDF). If the queue indicated by Hc_max is not available (e.g., the destination CDF is out-of-service or the destination CDF shuts down the queue), then distributor unit 110 may select the next highest Hc (Hc_max-1) as the destination queue for the accounting requests of the session. Distributor unit 110 may then route the accounting requests for the session to this destination queue to be processed by its associated CDF. This process continues until a destination queue is located that is able to handle the accounting request.

Selecting a destination queue based on a distribution algorithm as described above may also be acceptable the first time an accounting request is received for a session. However, the distribution algorithm can be processor-intensive, and using the distribution algorithm each time an accounting request is received can be a waste of resources. Also, selecting a destination queue for a session based on a distribution algorithm may be acceptable when the CDFs on an OFCS are operating correctly, but may not be desirable when one or more CDFs go out-of-service for a time period. To illustrate the problem, assume that the distribution algorithm is used to select a first destination queue for a session in response to receiving an initial accounting request for a session. If a first CDF associated with the first destination queue goes out-of-service at a later time, then the distribution algorithm may be used to select an alternate destination queue associated with a second CDF for subsequent accounting requests (e.g., interim(s) or stop). If the first CDF happens to recover while the session is still active, then the distribution algorithm may again select the first destination queue for the session for subsequent accounting requests. This scenario is a problem referred to as reversion, as handling of the session will revert back to the first CDF after it recovers. This will cause 'incomplete CDR' generation on the first CDF for the first part of the session, incomplete CDR generation on the second CDF for the second part of the session, and incomplete CDR generation again on the first CDF for the last part of the session. This increases the complexity for the downstream billing mediation system to combine the multiple incomplete CDRs into a coherent and complete CDR for the session. There is also a risk that the CDF associated with the first destination queue will again become overloaded if sessions are transferred back to it as soon as it recovers.

To avoid reversion, when a destination queue is selected for a session based on the distribution algorithm, an identifier or other information for the destination queue may be inserted in or added to the accounting messages (request or answer) that are exchanged for the session between the CTF and distributor unit 110. For example, if distributor unit 110 receives a start accounting request for a session, distributor unit 110 selects a destination queue for the session based the prioritized list. Distributor unit 110 may then insert an identifier for the destination queue in the start accounting request and/or a start accounting answer that is used to reply to the CTF. That way, the CTF is informed of the destination queue selected for the session, and inserts an identifier for the destination queue in subsequent accounting requests for the session. When distributor unit 110 receives a subsequent accounting request from the CTF, distributor unit 110 is able to extract the identifier for the destination queue from the accounting request instead of using the prioritized list. Therefore, accounting for the session is anchored to this destination queue while it is in service.

Another way to avoid reversion as described herein is to look at a status of the queues associated with CDFs 121-124 before selecting one of the queues as a destination for an accounting request. One proposal is to associate a status or state with each of the destination queues that indicates the availability of the queue to receive accounting requests for new sessions and ongoing sessions. The statuses of the queues may be designated as permeable, semi-permeable, and impermeable. When a permeable status is assigned to a queue, the queue is available to accept all types of accounting requests, such as for new sessions, ongoing sessions, and events. For example, a queue assigned a permeable status is available to accept ACR[Start], ACR[Interim], ACR[Stop], and ACR[Event] messages. When a semi-permeable status is assigned to a queue, the queue is available to accept accounting requests for ongoing sessions only (not new sessions). For example, a queue assigned a semi-permeable status is available to accept ACR[Interim] or ACR[Stop] messages. When an impermeable status is assigned to a queue, the queue is not available to accept any accounting requests for new sessions or ongoing sessions. Distributor unit 110 is able to monitor the status of each of the queues 151-154 associated with CDFs 121-124.

The concepts of avoiding reversion are described in more detail below.

Figure 2:
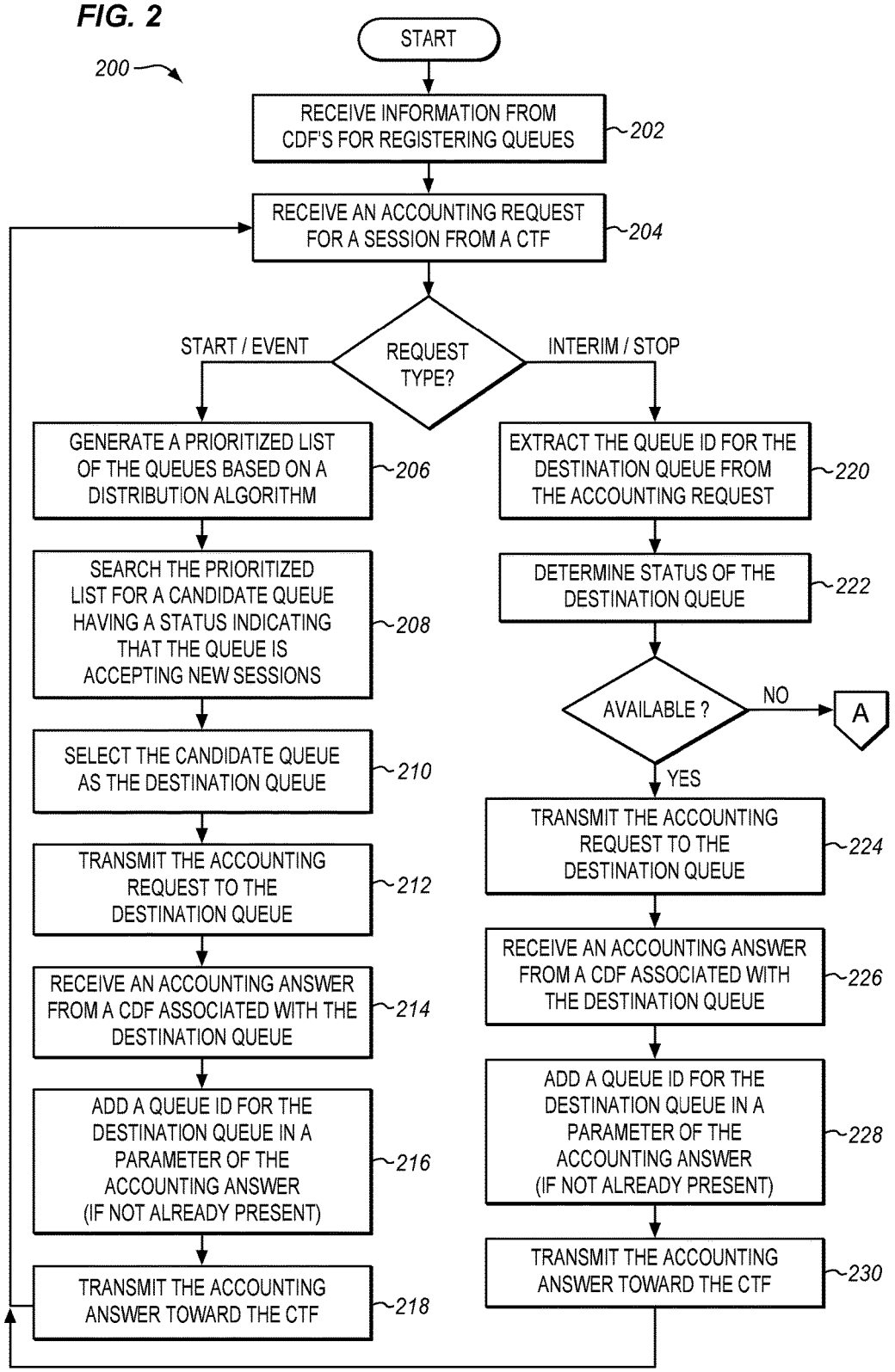
FIGS. 2-3 depict a flow chart illustrating a method of distributing accounting requests among a plurality of CDFs in an exemplary embodiment.
Figure 3:
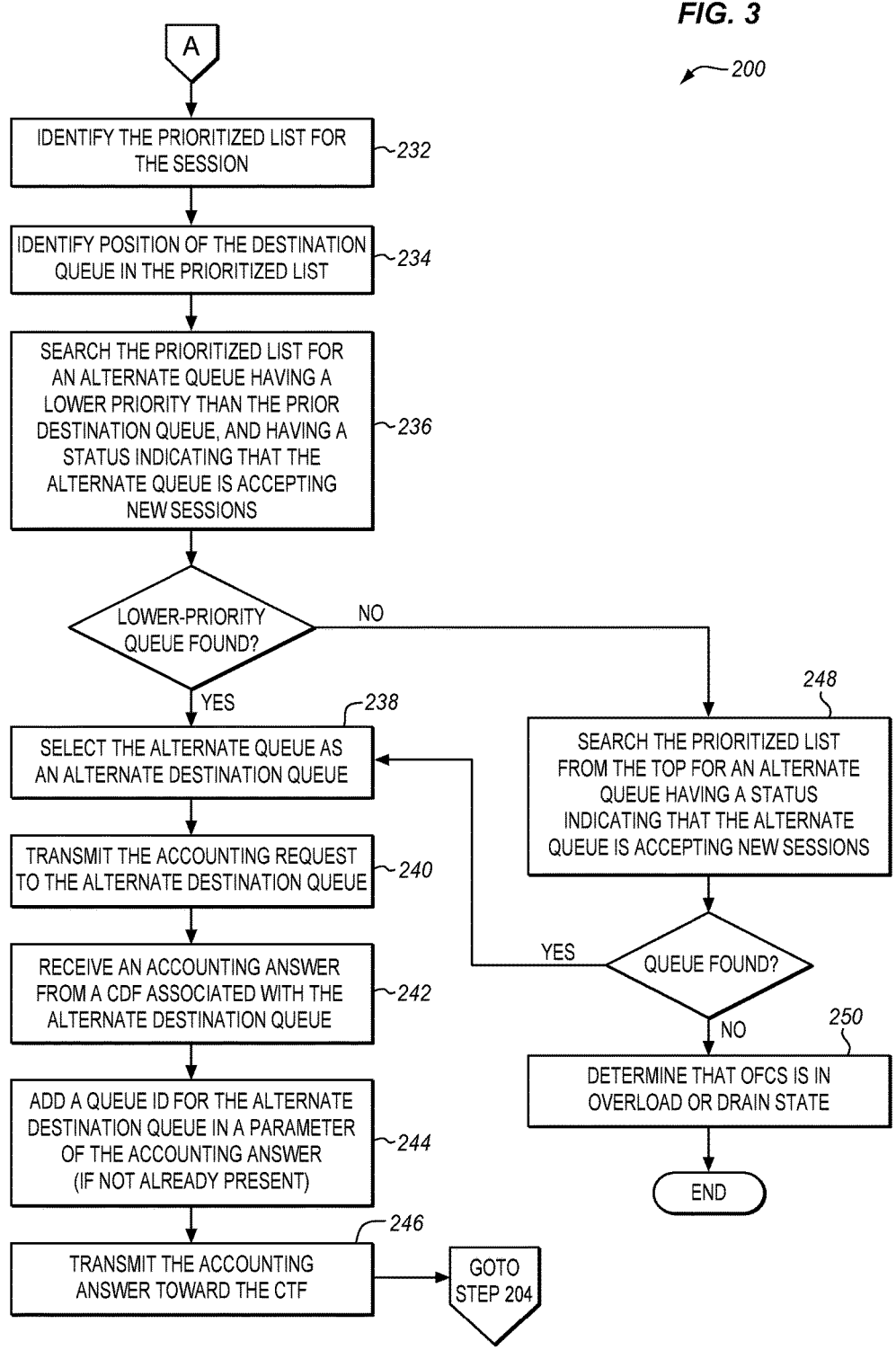

FIGS. 2-3 depict a flow chart illustrating a method 200 for distributing accounting requests among a plurality of CDFs 121-124 in an exemplary embodiment. The steps of method 200 will be described with reference to distributor unit 110 in FIG. 1, but those skilled in the art will appreciate that method 200 may be performed in other systems. Also, the steps of the flow charts described herein are not all inclusive and may include other steps not shown, and the steps may be performed in an alternative order.

Interface 112 or processor 114 of distributor unit 110 receives information from CDFs 121-124 for registering queues 151-154 associated with CDFs 121-124 (step 202). The information received by distributor unit 110 may indicate the number of queues registered by each CDF 121-124, names or identifiers for the queues, a status of the queues, etc. Processor 114 may then store this information for queues 151-154, such as in a local memory.

Assume for this embodiment that network element 102 provides a service for a session. CTF 104 within network element 102 detects a chargeable event for the service provided by network element 102, and CTF 104 assembles information for the chargeable event into an accounting request (e.g., start or event). For example, the accounting request may comprise a Diameter Rf ACR. CTF 104 then sends the accounting request for the session toward OFCS 120. The "session" as described herein may refer to a charging session or Diameter session.

Interface 112 of distributor unit 110 receives the accounting request for the session from CTF 104 (step 204). Processor 114 determines the type of accounting request, such as start, interim, stop, or event. When the accounting request is of type "start" or "event", processor 114 generates a prioritized list of queues 151-154 based on a distribution algorithm (step 206). The prioritized list is an ordered list of queues 151-154 as determined by the distribution algorithm for the session. For example, the prioritized list may be generated by a consistent hashing algorithm based on a session ID for the session, and names of the queues 151-154 registered by CDFs 121-124 as described above. Processor 114 searches the prioritized list for a candidate queue that has a status indicating that the candidate queue is accepting new sessions (step 208). For example, processor 114 may identify the top-most queue in the prioritized list as a candidate queue. Processor 114 then determines or verifies the status of the candidate queue. It may be the case that one or more CDFs 121-124 go out-of-service for a time period, or that one or more CDFs 121-124 change the status of their associated queues 151-154. Therefore, processor 114 determines whether the candidate queue has been assigned a permeable status and is available to accept a new session or event. If the candidate queue is available for a new session or event, then processor 114 selects this candidate queue as the destination queue for the session (step 210). If the candidate queue is not accepting new sessions, then processor 114 selects the next queue from the prioritized list as the next candidate queue. Processor 114 determines whether the next candidate queue has been assigned a permeable status and is available to accept a new session or event. This process continues until a candidate queue is identified in the prioritized list that has been assigned a permeable status, and processor 114 selects this candidate queue as the destination queue for the session (step 210). Interface 112 then transmits the accounting request to the destination queue (step 212).

In FIG. 1, the accounting request is received in the destination queue, and is processed by its associated CDF (i.e., destination CDF). The destination CDF generates an accounting answer (e.g., Diameter Accounting Answer (ACA)) as a response to the accounting request. The destination CDF then sends the accounting answer to distributor unit 110. Interface 112 of distributor unit 110 receives the accounting answer from the destination CDF (step 214 in FIG. 2). Processor 114 may add or append the queue ID for the destination queue in a parameter of the accounting answer if not already present (step 216). For example, if the accounting answer comprises a Diameter ACA, then processor 114 may add the queue ID to the Origin-Host AVP of the ACA message. Interface 112 then transmits the accounting answer toward CTF 104 (step 218).

In FIG. 1, CTF 104 receives the accounting answer from distributor unit 110, and extracts the queue ID from the accounting answer. CTF 104 then stores information for the destination queue for the session, such as in a local memory. CTF 104 may have a buffer for the sessions that are open, and the sessions are indexed or referenced in the buffer according to the "SessionId". CTF 104 may therefore store information for the destination queue along with other information for the session. CTF 104 stores the destination queue information for the lifetime of the session, and deletes the destination queue information when the session ends.

Assume further that CTF 104 detects another chargeable event for the session (i.e., session-based charging), and generates another accounting request for the session. Based on the information it has stored for the session, CTF 104 is able to determine that a destination queue has already been selected for this session. Therefore, CTF 104 adds the queue ID in a parameter of the accounting request indicating the destination queue for the session. For example, if the accounting request comprises a Diameter ACR, then CTF 104 may add a queue ID for the destination queue in the Destination-Host AVP of the ACR. CTF 104 then sends the accounting request to distributor unit 110.

Interface 112 of distributor unit 110 receives the accounting request from CTF 104 (step 204 in FIG. 2). Processor 114 determines the type of accounting request, such as start, interim, stop, or event. When the accounting request is of type "interim" or "stop" for an ongoing session, processor 114 extracts the queue ID for the destination queue from the accounting request (step 220). When an interim or stop accounting request is received, it is assumed that a destination queue has already been selected for the session, and that the accounting request is populated with a queue ID for the destination queue. Processor 114 determines or verifies the status of the destination queue indicated in the accounting request (step 222). It may be the case that the CDF 121-124 associated with the destination queue goes out-of-service for a time period, or that it changes the status of the destination queue (i.e., from permeable to semi-permeable, or from semi-permeable to impermeable). Therefore, processor 114 determines whether the destination queue is in a permeable state (i.e., available to accept accounting requests for new sessions and ongoing sessions) or semi-permeable state (i.e., available to accept accounting requests for ongoing sessions only). If the destination queue is available to accept ongoing sessions and new sessions, then interface 112 transmits the accounting request to the destination queue (step 224).

The accounting request is received in the destination queue, and is processed by its associated CDF as described above. Interface 112 of distributor unit 110 receives an accounting answer from the CDF associated with the destination queue (step 226). Processor 114 may add or append the queue ID for the destination queue in the accounting answer if not already present (step 228). Interface 112 then transmits the accounting answer toward CTF 104 (step 230). Method 200 may then return to step 204.

Referring to FIG. 3, if the destination queue is not available to accept new sessions or ongoing sessions (i.e., impermeable status), then processor 114 identifies the prioritized list of queues 151-154 for the session based on the distribution algorithm (step 232). In this step, processor 114 may generate the prioritized list again, or may retrieve the prioritized list, such as from memory. Processor 114 identifies a position or order of the destination queue in the prioritized list (step 234). Processor 114 then searches the prioritized list for an alternate queue that: 1) has a lower priority than the (prior) destination queue, and 2) has a status indicating that the alternate queue is accepting new sessions (step 236). In other words, processor 114 selects an alternate queue lower on the prioritized list that has been assigned a permeable status by its associated CDF. One purpose for searching for an alternate queue in the prioritized list that has a lower priority than the prior destination queue is so that session handling does not revert back to a queue higher on the prioritized list which has been placed back into service. Assume, for example, that the prioritized list enumerates queue-A, queue-B, queue-C, and queue-D (in that order) for a session. If queue-A is not available to receive accounting requests for the session, then distributor unit 110 will select queue-B to handle accounting requests for the session. If queue-B becomes unavailable during the ongoing session and queue-A has again become available, then distributor unit 110 could select queue-A again for the session based on the prioritized list because queue-A is at the top of the prioritized list. But in this example, queue-A has recently become available and it may be beneficial to avoid loading queue-A and its associated CDF again with accounting requests for an ongoing session. Therefore, processor 114 searches the prioritized list for a queue (e.g., queue-C and queue-D) that is lower in priority than the prior destination queue so that session handling does not automatically revert back to a higher-priority queue that recently recovered or became available.

One purpose for searching the prioritized list for a queue that has a status indicating that it is accepting new sessions is so that session handling is not transferred to a queue that has a semi-permeable status. A queue that assigned a semi-permeable status by its associated CDF accepts accounting requests for ongoing sessions (as opposed to new sessions). When processor 114 receives an accounting request of type "interim" or "stop", the accounting request is for an ongoing session. The purpose of assigning a semi-permeable status to a queue is to allow a CDF to regulate its load level on its queues to sessions that is it presently handling. Under certain conditions of overload or when an operator wants to isolate a CDF, a CDF may selectively accept accounting requests for sessions. In this case, the CDF distinguishes between session-start messages (e.g., ACR Start) and session-continuation messages (e.g., ACR Interim or ACR Stop). The CDF continues processing its ongoing sessions, while not accepting new sessions (or events) to process thereby providing selectively-permeable characteristics to the acceptance of accounting requests. This way, the CDF can regulate its load level and continue to process ongoing sessions to completion and generate complete CDRs. If not done correctly, an abrupt session redirection or rejection would typically result in the generation of incomplete CDRs, which may be rejected by the downstream billing mediation systems. A queue that is assigned a semi-permeable status may erroneously be sent an accounting request of type "interim" or "stop", even though the accounting request is not for a session presently being handled by that queue. This conflicts with the goal of selective permeability, by giving an accounting request to the queue for a session that is new to the queue. Therefore, processor 114 searches the prioritized list for a queue that has a status indicating that it is accepting new sessions (i.e., permeable) so that it does not transfer an accounting request for an ongoing session to a queue that has not previously handled that session.

In FIG. 3, if processor 114 identifies a lower-priority queue in the prioritized list that has a status indicating that it is accepting new sessions, then processor 114 selects that queue as an alternate destination queue (step 238). Interface 112 then transmits the accounting request to the alternate destination queue (step 240).

The accounting request is received in the alternate destination queue, and is processed by its associated CDF as described above. Interface 112 of distributor unit 110 receives an accounting answer from the CDF associated with the alternate destination queue (step 242). Processor 114 may add or append the queue ID for the alternate destination queue in a parameter of the accounting answer if not already present (step 244). Interface 112 then transmits the accounting answer toward CTF 104 (step 246). Method 200 may then return to step 204.

If there are no more queues in the prioritized list that are lower on the prioritized list and are accepting new sessions, then processor 114 searches the prioritized list from the top for an alternate queue that is accepting new sessions (step 248). If there are no queues found in the prioritized list that are accepting new sessions, then processor 114 determines that OFCS 120 is in an overload state or drain state (step 250). Therefore, OFCS 120 is not available to handle the accounting request, and distributor unit 110 may have to turn to another OFCS.

Method 200 may repeat a number of times during the session as CDFs 121-124 go out-of-service or queues 151-154 are removed from consideration by distributor unit 110. When the destination queue indicated in an interim or stop accounting request is not available, distributor unit 110 will identify a position of the destination queue in the prioritized list (step 234), and search the prioritized list for an alternate queue that: 1) has a lower priority than the (prior) destination queue, and 2) has a status indicating that the alternate queue is accepting new sessions (step 236). Therefore, even if a prior destination queue happens to become available during the session, distributor unit 110 will avoid reverting back to that prior destination queue so that the prior destination queue and its associated CDF have time to recover.

Figure 4:
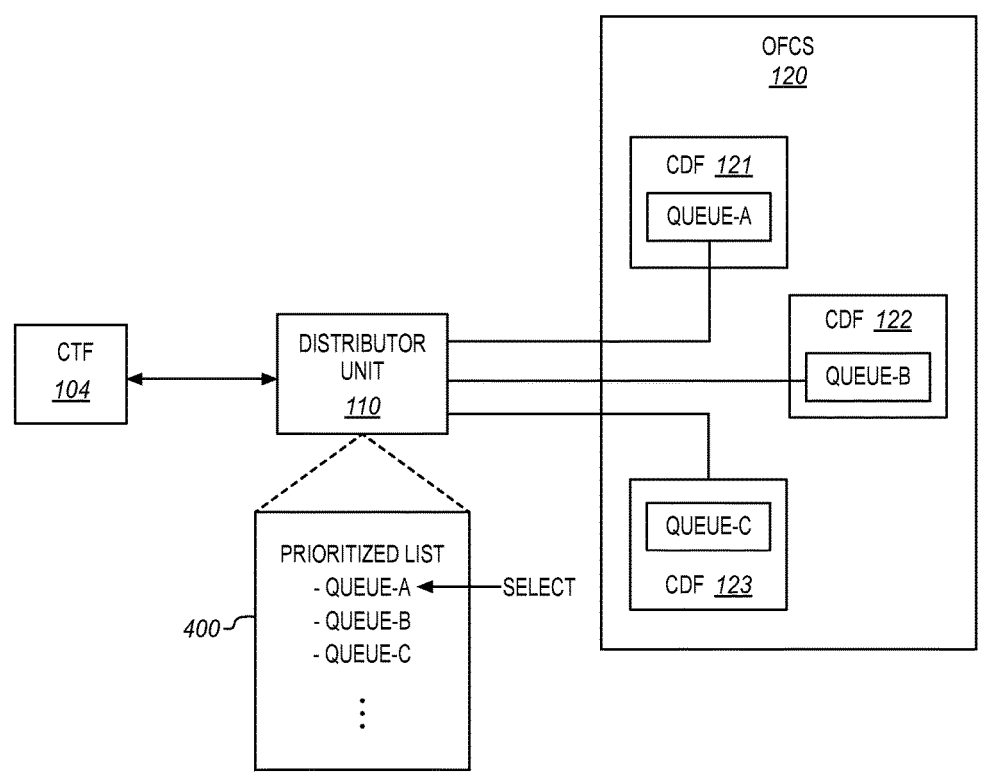
FIG. 4 is a block diagram of an offline charging architecture illustrating CDFs in an exemplary embodiment.

FIGS. 4-7 provide an example of distributing accounting requests among a plurality of CDFs 121-124. FIG. 4 is a block diagram of offline charging architecture 100 illustrating CDFs 121-123 in an exemplary embodiment. CDF 121 has queue-A as one of its processing queues, CDF 122 has queue-B as one of its processing queues, and CDF 123 has queue-C as one of its processing queues. CDFs 121-123 register their queues with distributor unit 110. At this point, distributor unit 110 may use a consistent hashing algorithm to statically determine a hashed value for each queue instance from the queue name.

Figure 5:
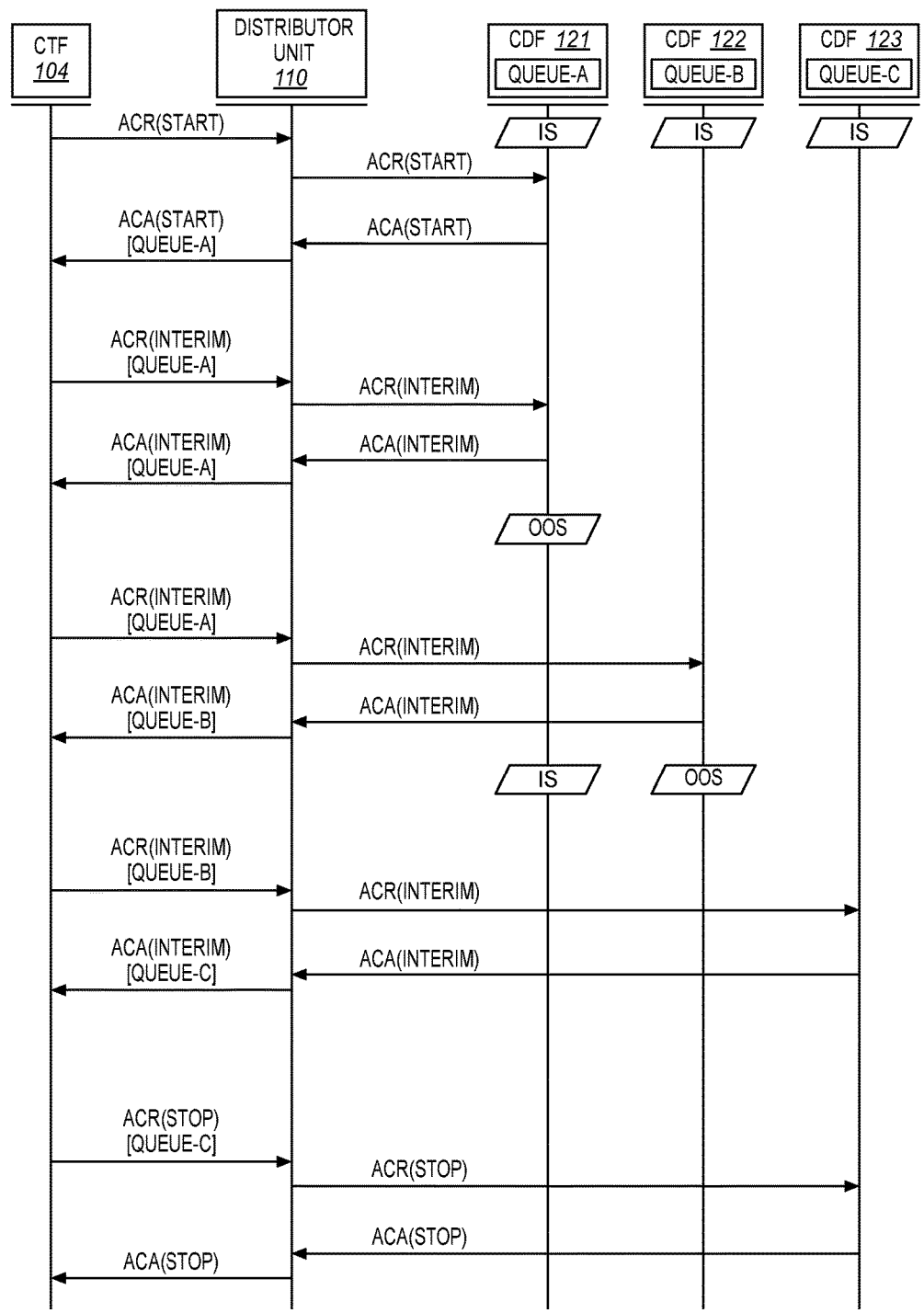
FIG. 5 is a message diagram illustrating distribution of Diameter ACRs in an exemplary embodiment.

CTF 104 is able to exchange Diameter messages with distributor unit 110, and distributor unit 110 is enabled to distribute Diameter ACRs among CDFs 121-124. FIG. 5 is a message diagram illustrating distribution of Diameter ACRs in an exemplary embodiment. To begin in FIG. 5, CTF 104 detects a chargeable event for a service provided by network element 102 for a session (see FIG. 1). CTF 104 assembles information for the chargeable event into a Diameter Rf ACR. The type of accounting for the service is session-based, so CTF 104 inserts a "start" value in the Accounting-Record-Type AVP of the ACR. CTF 104 then sends the ACR(start) to distributor unit 110.

In response to receiving the ACR(start), distributor unit 110 determines the type of the ACR, which is a "start" in this example. Distributor unit 110 then generates a prioritized list 400 of queues based on the consistent hashing algorithm (or another type of distribution algorithm). For example, distributor unit 110 dynamically determines a hashed value for the session ID (e.g., DSID) that has been assigned to the session. Distributor unit 110 then computes the hash for each set of (SessionID, QueueName). In this example, prioritized list 400 indicates queue-A, queue-B, and queue-C in that order. Distributor unit 110 determines whether the ACR (start) includes a queue ID indicating a destination queue that has already been selected for the session. More particularly, distributor unit 110 may process the Destination-Host AVP included in the ACR(start) to determine whether a queue ID has been added to this AVP. Because the session has just started, a destination queue has not been selected for the session, and the ACR(start) does not include a queue ID. Therefore, distributor unit 110 selects a destination queue for the session based on prioritized list 400.

In this instance, distributor unit 110 searches from the top of prioritized list 400 for a candidate queue that is accepting new sessions. Assume for this embodiment that distributor unit 110 selects queue-A of CDF 121 as the destination queue. Distributor unit 110 then routes the ACR(start) to queue-A of CDF 121. CDF 121 receives the ACR(start) through queue-A, and processes the ACR(start) normally. CDF 121 also generates a Diameter Rf Accounting Answer (ACA) as a response to the ACR(start). Distributor unit 110 receives the ACA(start) from CDF 121, and may insert the queue ID for the destination queue in the ACA(start) if not already included. Distributor unit 110 then routes the ACA (start) to CTF 104. CTF 104 stores the queue ID for the destination queue along with other information for the session.

At a later time, CTF 104 detects another chargeable event, and assembles information for the chargeable event into another Diameter ACR for the session. CTF 104 inserts a record type into the Diameter request indicating the ACR as an "interim" message. CTF 104 also determines that a destination queue has already been selected for this session based on the information provided in a prior ACA message (i.e., ACA(start)). Therefore, CTF 104 inserts the queue ID in the ACR(interim), and sends the ACR(interim) to distributor unit 110.

In response to receiving the ACR(interim), distributor unit 110 determines the type of the ACR, which is "interim" in this example. When the ACR is of type "interim", distributor unit 110 extracts the queue ID for the destination queue from the ACR(interim). Distributor unit 110 then determines the status of the destination queue (i.e., queue-A), and routes the ACR(interim) to queue-A of CDF 121 if it has a permeable or semi-permeable status. The session is therefore anchored to the destination queue indicated in the Diameter messages.

CDF 121 receives the ACR(interim) through queue-A, and determines that the ACR(interim) includes a queue ID. CDF 121 processes the ACR(interim) normally, and generates an ACA(interim) as a response to the ACR(interim). Distributor unit 110 receives the ACA(interim), and may insert the queue ID for the destination queue in the ACA (interim) if not already included. Distributor unit 110 then routes the ACA(interim) to CTF 104 with the queue ID.

CTF 104 may detect multiple interim events, and send multiple ACRs(interim) to distributor unit 110. Distributor unit 110 operates as described above for each ACR(interim) it receives.

Assume again that CTF 104 detects another chargeable event, and assembles information for the chargeable event into another Diameter ACR for the session. CTF 104 inserts a record type into the Diameter request indicating the ACR as an "interim" message. CTF 104 also determines that a destination queue has already been selected for this session based on the information provided in a prior ACA message (i.e., ACA(start) or ACA(interim)). Therefore, CTF 104 inserts the queue ID in the ACR(interim), and sends the ACR(interim) to distributor unit 110.

Figure 6:
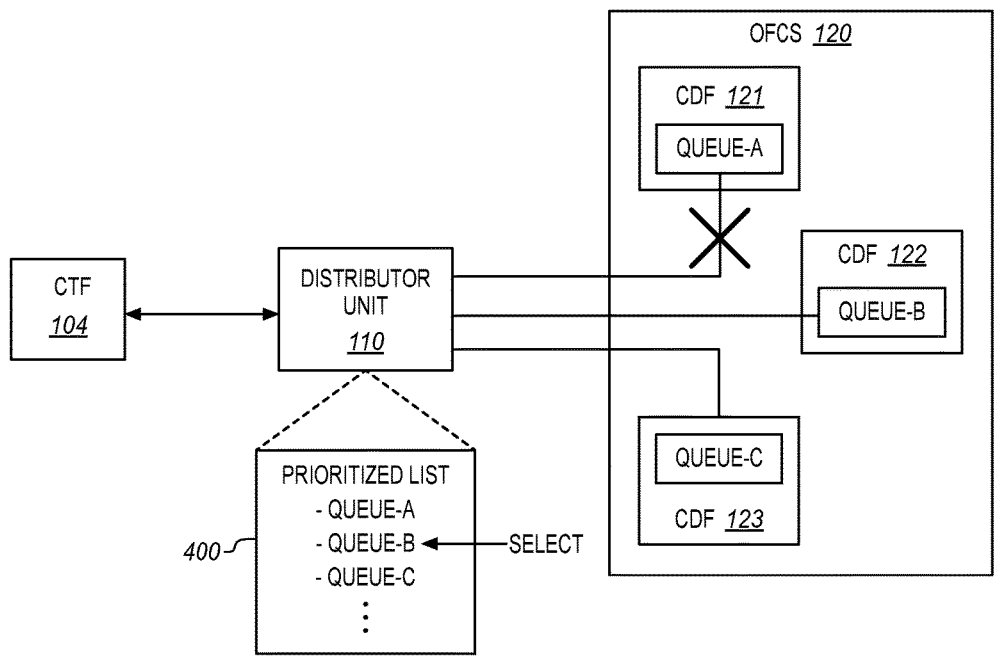
FIG. 6 is a block diagram of an offline charging architecture illustrating CDFs in an exemplary embodiment.

In response to receiving the ACR(interim), distributor unit 110 determines the type of the ACR, which is "interim" in this example. When the ACR is of type "interim or stop", distributor unit 110 extracts the queue ID for the destination queue from the ACR. Distributor unit 110 then determines the status of the destination queue (i.e., queue-A). As shown in FIG. 6, CDF 121 goes out-of-service (OOS) and queue-A is not available to receive any requests (either for new sessions or ongoing sessions). Therefore, distributor unit 110 identifies prioritized list 400 for the session, and identifies a position of the destination queue (queue-A) in prioritized list 400. Distributor unit 110 then searches prioritized list 400 for an alternate queue that: 1) has a lower priority than the (prior) destination queue, and 2) has a status indicating that the alternate queue is accepting new sessions (i.e., has a permeable status). Assume that queue-B of CDF 122 has a lower priority in the prioritized list than queue-A, and has a permeable status. Distributor unit 110 therefore selects queue-B of CDF 122 as an alternate destination queue for the session as illustrated in FIG. 6. Distributor unit 110 then routes the ACR(interim) to queue-B of CDF 122 (see FIG. 5). Operation continues as described above.

If CTF 104 detects another interim chargeable event, it assembles yet another ACR(interim). CTF 104 determines that a destination queue has already been selected for this session as provided in a prior ACA message. Therefore, CTF 104 adds the queue ID in a parameter of the ACR(interim), and sends the ACR(interim) to distributor unit 110.

Figure 7:
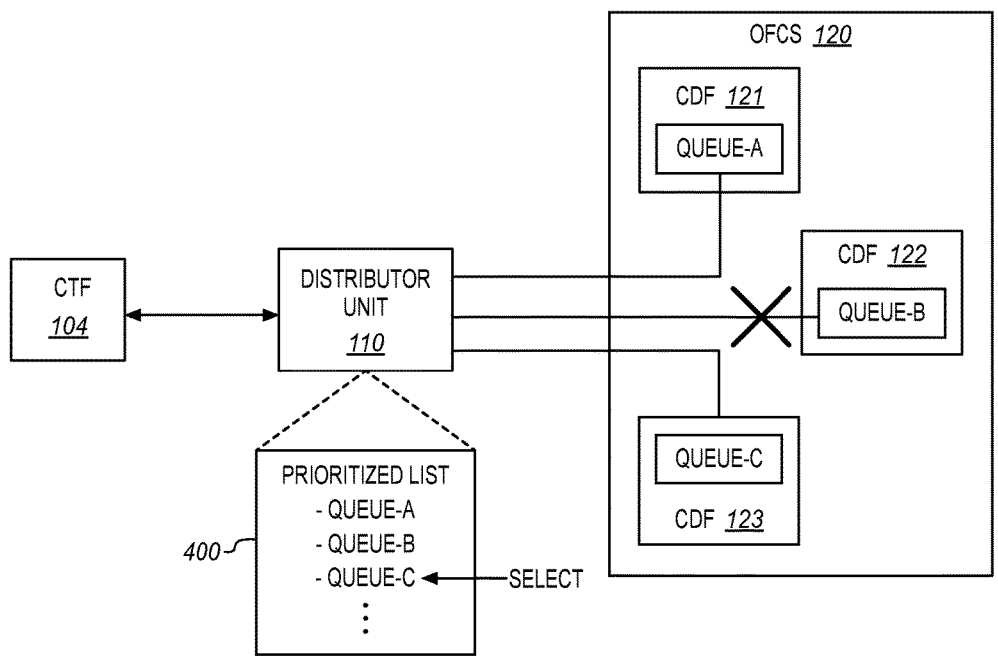
FIG. 7 is a block diagram of an offline charging architecture illustrating CDFs in an exemplary embodiment.

In response to receiving the ACR(interim), distributor unit 110 determines the type of the ACR, which is "interim" in this example. When the ACR is of type "interim or stop", distributor unit 110 extracts the queue ID that indicates the identity of the alternate destination queue selected for the session, which is queue-B of CDF 122. Distributor unit 110 determines the status of the alternate destination queue (i.e., queue-B of CDF 122). As shown in FIG. 7, CDF 122 has gone out-of-service (OOS) and is queue-B is not available to receive any requests (either for new sessions or ongoing sessions). Also, CDF 121 has recovered and placed queue-A back in-service (IS) with a permeable status. Distributor unit 110 identifies prioritized list 400 for the session, and identifies a position of the alternate destination queue (queue-B) in prioritized list 400. Distributor unit 110 then searches prioritized list 400 for an alternate queue that: 1) has a lower priority than the (prior) destination queue, and 2) has a status indicating that the alternate queue is accepting new sessions (i.e., has a permeable status). Assume that queue-C of CDF 123 has a lower priority in the prioritized list than queue-B of CDF 122, and has a permeable status. Distributor unit 110 therefore selects queue-C of CDF 123 as an alternate destination queue for the session as illustrated in FIG. 7. Distributor unit 110 then routes the ACR(interim) to queue-C of CDF 123. Operation continues as described above.

When there are failover scenarios as described above, distributor unit 110 searches for queues lower in prioritized list 400 when selecting an alternate destination queue. Even though the queue on the top of prioritized list 400 (queue-A) recovered while distributor unit 110 was attempting to re-home the session, distributor unit 110 searches for queues lower in prioritized list 400. Distributor unit 110 does this to avoid reverting sessions back to a queue (i.e., queue-A) that was recently put back into service. That way, if CDF 121 had recently recovered from an overload condition, then distributor unit 110 avoids transferring the session back to queue-A and risking another overload condition in CDF 121. Instead, distributor unit 110 searches for a queue lower in the prioritized list that is available to accept new sessions. In the above example, if CDF 123 takes queue-C out-of-service, distributor unit 110 will again search for queues lower in prioritized list 400 to select an alternate destination queue. If a lower-priority queue is not available, then distributor unit 110 will search from the beginning of prioritized list for a candidate queue that has a permeable status.

At some point, CTF 104 detects a final chargeable event, and assembles information for the chargeable event into a Diameter ACR(stop) for the Diameter session. CTF 104 inserts a record type into the ACR to indicate the ACR as a "stop" message. CTF 104 also determines that a destination queue has already been selected for this session, adds the queue ID to the ACR(stop), and sends the ACR(stop) to distributor unit 110 (see FIG. 5). Distributor unit 110 operates as described above to handle distribution of the ACR (stop).

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

I claim:

1. A system comprising:
    a distributor unit configured to connect to a plurality of Charging Data Functions (CDFs) of an Offline Charging System (OFCS) through an interface, and to receive information from the CDFs for registering queues associated with the CDFs;
    the distributor unit comprising a processor configured to receive an initial accounting request from a Charging Trigger Function (CTF) for a session through the interface, to generate a prioritized list of the queues for the session based on a distribution algorithm, to select a destination queue from the prioritized list for the session, and to transmit the initial accounting request to the destination queue through the interface;
    the processor is configured to receive a subsequent accounting request from the CTF for the session through the interface, to extract a first identifier from a parameter of the subsequent accounting request indicating the destination queue previously selected for the session, and to determine a status of the destination queue;
    when the status of the destination queue indicates that the destination queue is not accepting new sessions or ongoing sessions, the processor is configured to:
    identify the prioritized list for the session;
    identify a position of the destination queue in the prioritized list;
    search the prioritized list for a first alternate queue having a lower priority than the destination queue, and having a status indicating that the first alternate queue is accepting new sessions;
    select the first alternate queue as an alternate destination queue for the session; and
    transmit the subsequent accounting request to the alternate destination queue through the interface.

2. The system of claim 1 wherein:
    the subsequent accounting request comprises a Diameter Accounting Request (ACR); and
    the processor is configured to extract the first identifier from a Destination-Host Attribute Value Pair (AVP) of the ACR indicating the destination queue.

3. The system of claim 1 wherein:
    the processor is configured to receive an accounting answer for the subsequent accounting request from a CDF associated with the alternate destination queue through the interface, to add a second identifier for the alternate destination queue in a parameter of the accounting answer, and to transmit the accounting answer toward the CTF through the interface.

4. The system of claim 3 wherein:
    the accounting answer comprises a Diameter Accounting Answer (ACA); and
    the processor is configured to add the second identifier for the alternate destination queue to an Origin-Host Attribute Value Pair (AVP) of the ACA.

5. The system of claim 1 wherein:
    when the processor fails to find the first alternate queue in the prioritized list having a lower priority than the destination queue, and having a status indicating that the first alternate queue is accepting new sessions, the processor is configured to search from a top of the prioritized list for a second alternate queue having a status indicating that the second alternate queue is accepting new sessions.

6. The system of claim 5 wherein:
    when the processor fails to find the second alternate queue in the prioritized list having a status indicating that the second alternate queue is accepting new sessions, the processor is configured to determine that the OFCS is in an overload state.

7. The system of claim 1 wherein:
    the distribution algorithm comprises a consistent hashing algorithm that generates the prioritized list of the queues based on a session identifier for the session, and names for the queues.

8. The system of claim 1 wherein:
the processor is configured to monitor the status of each of the queues; and
the status of each of the queues indicates one of the following: accepting new sessions and ongoing sessions, accepting ongoing sessions only, or not accepting new sessions or ongoing sessions.

9. The system of claim 1 wherein:
in response to the initial accounting request, the processor is configured to search the prioritized list for a candidate queue having a status indicating that the candidate queue is accepting new sessions, and to select the candidate queue as the destination queue for the session.

10. A method of distributing accounting requests for a session from a distributor unit to a plurality of Charging Data Functions (CDFs) of an Offline Charging System (OFCS), the method comprising:
receiving information in the distributor unit from the CDFs for registering queues associated with the CDFs;
receiving an initial accounting request in the distributor unit from a Charging Trigger Function (CTF) for a session;
generating, at the distributor unit, a prioritized list of the queues for the session based on a distribution algorithm;
selecting, at the distributor unit, a destination queue from the prioritized list for the session;
transmitting the initial accounting request from the distributor unit to the destination queue;
receiving a subsequent accounting request in the distributor unit from the CTF for the session;
extracting, at the distributor unit, a first identifier from a parameter of the subsequent accounting request indicating the destination queue previously selected for the session;
determining, at the distributor unit, a status of the destination queue;
when the status of the destination queue indicates that the destination queue is not accepting new sessions or ongoing sessions, the method includes:
identifying the prioritized list for the session;
identifying a position of the destination queue in the prioritized list;
searching the prioritized list for a first alternate queue having a lower priority than the destination queue, and having a status indicating that the first alternate queue is accepting new sessions;
selecting the first alternate queue as an alternate destination queue for the session; and
transmitting the subsequent accounting request from the distributor unit to the alternate destination queue.

11. The method of claim 10 wherein:
the subsequent accounting request comprises a Diameter Accounting Request (ACR); and
extracting the first identifier from the parameter of the subsequent accounting request comprises extracting the first identifier from a Destination-Host Attribute Value Pair (AVP) of the ACR indicating the destination queue.

12. The method of claim 10 further comprising:
receiving an accounting answer for the subsequent accounting request in the distributor unit from a CDF associated with the alternate destination queue;
adding, at the distributor unit, a second identifier for the alternate destination queue in a parameter of the accounting answer; and
transmitting the accounting answer from the distributor unit toward the CTF.

13. The method of claim 12 wherein:
the accounting answer comprises a Diameter Accounting Answer (ACA); and
adding the second identifier for the alternate destination queue in the parameter of the accounting answer comprises adding the second identifier for the alternate destination queue to an Origin-Host Attribute Value Pair (AVP) of the ACA.

14. The method of claim 10 wherein:
when the search fails to find the first alternate queue in the prioritized list having a lower priority than the destination queue, and having a status indicating that the first alternate queue is accepting new sessions, the method comprises:
searching from a top of the prioritized list for a second alternate queue having a status indicating that the second alternate queue is accepting new sessions.

15. The method of claim 14 wherein:
when the search fails to find the second alternate queue in the prioritized list having a status indicating that the second alternate queue is accepting new sessions, the method comprises:
determining, at the distributor unit, that the OFCS is in an overload state.

16. The method of claim 10 further comprising:
monitoring the status of each of the queues;
wherein the status of each of the queues indicates one of the following: accepting new sessions and ongoing sessions, accepting ongoing sessions only, or not accepting new sessions or ongoing sessions.

17. The method of claim 10 further comprising:
in response to the initial accounting request, the method comprises:
searching the prioritized list for a candidate queue having a status indicating that the candidate queue is accepting new sessions; and
selecting the candidate queue as the destination queue for the session.

18. A non-transitory computer readable medium embodying programmed instructions executed by a processor of a distributor unit that connects to a plurality of Charging Data Functions (CDFs) of an Offline Charging System (OFCS), wherein the instructions direct the processor to:
receive information from the CDFs for registering queues associated with the CDFs through an interface;
receive an initial accounting request from a Charging Trigger Function (CTF) for a session through the interface;
generate a prioritized list of the queues for the session based on a distribution algorithm;
select a destination queue from the prioritized list for the session;
transmit the initial accounting request to the destination queue through the interface;
receive a subsequent accounting request from the CTF for the session through the interface;
extract a first identifier from a parameter of the subsequent accounting request indicating the destination queue previously selected for the session;
determine a status of the destination queue;
when the status of the destination queue indicates that the destination queue is not accepting new sessions or ongoing sessions:
identify the prioritized list for the session;
identify a position of the destination queue in the prioritized list;

search the prioritized list for a first alternate queue having a lower priority than the destination queue, and having a status indicating that the first alternate queue is accepting new sessions;

select the first alternate queue as an alternate destination queue for the session; and transmit the subsequent accounting request to the alternate destination queue through the interface.

19. The computer readable medium of claim 18 wherein:

when the search fails to find the first alternate queue in the prioritized list having a lower priority than the destination queue, and having a status indicating that the first alternate queue is accepting new sessions, the instructions direct the processor to:

search from a top of the prioritized list for a second alternate queue having a status indicating that the second alternate queue is accepting new sessions.

20. The computer readable medium of claim 19 wherein:

when the search fails to find the second alternate queue in the prioritized list having a status indicating that the second alternate queue is accepting new sessions, the instructions direct the processor to:

determine that the OFCS is in an overload state.

\* \* \* \* \*